US012603589B2

(12) United States Patent
Qi et al.

(10) Patent No.: US 12,603,589 B2
(45) Date of Patent: Apr. 14, 2026

(54) ELECTRIC TRACTION SYSTEM

(71) Applicants: CRRC Zhuzhou Institute Co., Ltd, Zhuzhou (CN); Zhuzhou CRRC Times Electric Co., Ltd., Zhuzhou (CN)

(72) Inventors: Yu Qi, Zhuzhou (CN); Wenqing Mei, Zhuzhou (CN); Liangjie Liu, Zhuzhou (CN); Zechun Dou, Zhuzhou (CN); Xiong Liu, Zhuzhou (CN); Yuecheng Xie, Zhuzhou (CN); Bin Liu, Zhuzhou (CN)

(73) Assignees: CRRC ZHUZHOU INSTITUTE CO., LTD, Zhuzhou (CN); ZHUZHOU CRRC TIMES ELECTRIC CO., LTD., Zhuzhou (CN)

( * ) Notice: Subject to any disclaimer, the term of this patent is extended or adjusted under 35 U.S.C. 154(b) by 108 days.

(21) Appl. No.: 18/575,939

(22) PCT Filed: Jul. 2, 2021

(86) PCT No.: PCT/CN2021/104299
§ 371 (c)(1),
(2) Date: Jan. 2, 2024

(87) PCT Pub. No.: WO2023/272727
PCT Pub. Date: Jan. 5, 2023

(65) Prior Publication Data
US 2024/0313674 A1    Sep. 19, 2024

(51) Int. Cl.
*H02P 5/74*    (2006.01)
(52) U.S. Cl.
CPC ...................................... *H02P 5/74* (2013.01)
(58) Field of Classification Search
CPC ....................................................... H02P 5/74
(Continued)

(56) References Cited

U.S. PATENT DOCUMENTS 4,326,157 A * 4/1982 Herbert ................... H02P 23/28
                                                    318/729
8,395,335 B2 * 3/2013 Marchand ................. B60L 7/14
                                                    318/362
(Continued)

FOREIGN PATENT DOCUMENTS

CN          105966266 A       9/2016
CN          107769239 A       3/2018
(Continued)

OTHER PUBLICATIONS

International Search Report and Written Opinion for International Application No. PCT/CN2021/104299, dated Nov. 26, 2021, 13 pages.

(Continued)

*Primary Examiner* — David Luo
(74) *Attorney, Agent, or Firm* — Tarolli, Sundheim, Covell & Tummino LLP

(57) ABSTRACT

There is provided an electric traction system 1, comprising: a traction converter module 2 comprising: a positive input terminal 4 and a negative input terminal 6 for operatively coupling to a DC power supply, and a plurality of power inverters 11, each of which comprises positive and negative input nodes 3, 5 configured to receive DC power and output nodes 9 configured to supply AC power, wherein the positive and negative input nodes 3, 5 of the plurality of power inverters 11 are electrically connected in series between the positive input terminal 4 and the negative input terminal 6; and at least one electric motor 8 configured to be driven by the traction converter module 2, the at least one electric motor 8 comprising a multi-phase electric motor 8₁.

18 Claims, 3 Drawing Sheets

(58) Field of Classification Search
    USPC ................................................... 318/34, 255
    See application file for complete search history.

(56) References Cited

U.S. PATENT DOCUMENTS

|  |  |  |  |
|---|---|---|---|
| 9,481,252 B1 * | 11/2016 | Si | B60L 15/2009 |
| 10,532,911 B2 * | 1/2020 | Rodriguez | B66B 1/30 |
| 11,063,531 B2 * | 7/2021 | Han | H02K 11/33 |
| 2015/0236634 A1 | 8/2015 | Han et al. |  |
| 2017/0070175 A1 | 3/2017 | Butzmann et al. |  |
| 2017/0353083 A1 | 12/2017 | Shrestha et al. |  |

FOREIGN PATENT DOCUMENTS

|  |  |  |
|---|---|---|
| CN | 109256764 A | 1/2019 |
| EP | 2 368 744 A2 | 9/2011 |

OTHER PUBLICATIONS

Office Action for EP application No. 21 742 688.1, dated Nov. 14, 2025, 7 pages.

* cited by examiner

ELECTRIC TRACTION SYSTEM

CROSS-REFERENCE TO RELATED APPLICATIONS

This application is a U.S. National Stage Application filed under 35 U.S.C. § 371 of PCT/CN2021/104299, filed Jul. 2, 2021, and entitled "ELECTRIC TRACTION SYSTEM". The entire contents of each of the above-identified patent applications are incorporated herein by reference.

TECHNICAL FIELD

The present disclosure relates to an electric traction system. More particularly, but not exclusively, the present disclosure relates to an electric traction system which receives direct current (DC) power and drives electric motor loads. Such an electric traction system is suitable for use in various power electronics applications, such as, urban rail transit applications.

BACKGROUND

An electric traction system converts electrical energy into mechanical energy by driving an electric motor using the electrical energy, thereby generating a traction force which causes the propulsion of an electric machine. A typical example of the electric machine is a vehicle (such as, a locomotive, an electric or hydrogen vehicle, an elevator or an electric multiple unit). The electric motor may also be referred to as a traction motor.

An electric traction system may use either a DC or an alternating current (AC) power supply. Generally speaking, urban rail transit applications (e.g., subways) adopt traction systems powered by a DC grid. The DC power may be supplied by either an overhead wire or a third rail in an urban rail transit application.

FIG. 1 schematically illustrates a prior electric traction system 100 used in urban rail transit applications. The prior traction system 100 comprises a DC-AC power converter circuit 102 which receives DC power at input nodes 104, 106 and supplies AC power at output nodes 109. The DC-AC power converter circuit 102 may also be referred to as a power inverter. In a typical example, the power inverter 102 is a three-phase full-bridge inverter, with either two output levels (two-level) or three output levels (three-level). The prior traction system 100 further comprises an electric motor 108. The electric motor 108 is typically a three-phase AC motor, which may be an asynchronous motor or a permanent magnet synchronous motor in conventional rail transit applications. The stator windings of the motor 108 are electrically connected to the output nodes 109 of the power inverter 102.

The power inverter 102 is constructed with power semiconductor devices and is responsible for inverting input DC power to three-phase AC power so as to drive the motor 108. For urban rail transit applications, the DC grid voltage applied between the positive and negative input nodes 104, 106 of the inverter 102 is normally rated at 1500V. In the event that the inverter 102 is constructed as a three-phase full-bridge two-level inverter, 3300V-rated silicon-based (Si-based) insulated gate bipolar transistors (IGBTs) are often used as the power semiconductor devices within the inverter 102. In the event that the inverter 102 is constructed as a three-phase full-bridge three-level inverter, 1700V-rated Si-based IGBTs are often used as the power semiconductor devices within the inverter 102. These two circuit topologies of the power inverter 102 are well developed and there is limited room for further improving the efficiency and reducing the costs of the power inverter 102. Further, the power inverter 102 outputs all of the power required by the motor 108. Therefore, the power inverter 102 is subject to high power output requirements, which in turn require the use of power semiconductor devices with high power ratings.

High-efficiency, lightweight, and miniaturization have always been the main targets for the development of traction systems in rail transit applications. In addition, it is also desirable to reduce the costs of such traction systems.

The latest 1700V or 3300V rated Silicon Carbide (SiC) based power semiconductor devices may be used to replace Si-based IGBTs with the same voltage ratings. Using SiC-based devices within the power inverter 102 may reduce loss, increase efficiency, and contribute to lightweight and miniaturization of the power inverter 102 through design optimization. However, costs of SiC-based devices are very high, and reliabilities of SiC-based devices at 1700V or higher voltage ratings are yet to be verified. Therefore, employing SiC devices within the power inverter 102 is still at prototyping and experimenting stages.

It is an object of the present disclosure, among others, to provide an electric traction system, which provides improvements over known traction systems.

SUMMARY

According to a first aspect of the present disclosure, there is provided an electric traction system, comprising:

a traction converter module comprising: a positive input terminal and a negative input terminal for operatively coupling to a DC power supply, and a plurality of power inverters, each of which comprises positive and negative input nodes configured to receive DC power, and output nodes configured to supply AC power, wherein the positive and negative input nodes of the plurality of power inverters are electrically connected in series between the positive input terminal and the negative input terminal; and at least one electric motor configured to be driven by the traction converter module, the at least one electric motor comprising a multi-phase electric motor.

By electrically connecting the positive and negative input nodes of the plurality of power inverters in series between the positive input terminal and the negative input terminal, the input sides of the plurality of power inverters collectively share a DC voltage provided by the DC power supply. As a result, each of the power inverters receives a fraction of the DC voltage between its positive and negative input nodes. Consequently, each of the power inverters is allowed to use power semiconductor devices which have reduced voltage ratings. Power semiconductor devices with lower voltage ratings typically have smaller package dimensions, lower prices, and higher maturity than power semiconductor devices with higher voltage ratings. Further, low-voltage power semiconductor devices provide lower switching loss and higher efficiency than high-voltage power semiconductor devices. In addition, low-voltage power semiconductor devices relax cooling and heat exchange requirements, enabling the traction system to have reduced weight, volume and costs.

It would be appreciated that the multi-phase electric motor is a single motor which comprises more than three phases. As compared to a conventional three-phase electric motor, the multi-phase electric motor has a greater fault tolerance because it provides phase redundancy and can operate during phase open fault. Therefore, the use of the multi-phase electric motor improves the reliability of the electric traction system. Further, the multi-phase electric motor achieves higher torque density, reduced amplitude and increased frequency of torque pulsation, higher efficiency, lower DC link current harmonics as well as better noise and vibration characteristic, as compared to a conventional three-phase motor. Further still, the multi-phase electric motor can be controlled with a greater degree of freedom than a conventional three-phase electrical motor, thereby enabling the multi-phase electric motor to achieve greater regulations of torque and the shaft voltage.

Therefore, the electric traction system of the present disclosure has a higher efficiency, reduced weight and volume as well as reduced costs as compared to prior electric traction systems.

The electric motor may also be referred to as a traction motor (which generates a traction force causing the propulsion of an electric machine). It would also be understood that the electric motor is an AC motor.

The multi-phase electric motor may be driven by one or more of the plurality of power inverters.

With the expression "for operatively coupling to a DC power supply", it is intended to mean that the DC power supply may not be a part of the electric traction system.

With the expression "the positive and negative input nodes of the plurality of power inverters are electrically connected in series between the positive input terminal and the negative input terminal", it is meant that the negative input node of a power inverter is connected to the positive input node of a subsequent neighbouring power inverter, and/or the positive input node of the power inverter is connected to the negative input node of a precedent neighbouring power inverter.

The term "power inverter" may also be referred to as a DC-to-AC power converter. In other words, a power inverter converts DC power received at its input nodes to AC power for outputting at its output nodes.

The term "operatively coupled" or "operatively coupling" used in the present disclosure means that one or more intervening elements may be connected between the coupled elements.

The plurality of power inverters may comprise a first power inverter and a second power inverter, and the output nodes of the first and second power inverters may be configured to supply AC power to the multi-phase electric motor so as to drive the multi-phase electric motor.

By having the first and second power inverters to collectively drive the multi-phase electric motor, each of the first and second power inverters supplies a fraction of the total power required by the multi-phase electric motor. Accordingly, the required power rating of each power inverter as well as the required power ratings of the semiconductor devices used therein may be reduced.

It would be appreciated that the plurality of power inverters may include further power inverter(s) in addition to the first and second power inverters. It would further be appreciated that the terms "first" and "second" are simply used to label the power inverters for the ease of description, and do not imply any limitations to the sequences or locations of the inverters within the traction converter module. The first power inverter may or may not be immediately adjacent to the second power inverter.

The first and second power inverters may have identical circuit topologies. Advantageously, the identical circuit topologies allow the first and second power inverters to achieve power matching by supply an equal amount of power to the multi-phase electric motor.

The multi-phase electric motor may comprise a first set of stator windings and a second set of stator windings. The output nodes of the first power inverter may be electrically coupled to the first set of stator windings, and the output nodes of the second power inverter may be electrically coupled to the second set of stator windings.

The term "electrically coupled" used in the present disclosure means that one or more intervening elements (e.g., electrical contacts) may be connected between the coupled elements.

It would be appreciated that the multi-phase electric motor may include further set(s) of stator windings.

The first set of stator windings and the second set of stator windings may be electrically isolated from one another.

Advantageously, the electrical isolation between sets of stator windings improves system reliability.

A number of phases of the first power inverter may be identical to a number of phases of the first set of stator windings.

In other words, the first power inverter outputs M phases of AC power at its output nodes, and the first set of stator windings comprises M phases of stator windings. M may be an integer equal to or greater than three.

A number of the output nodes of the first power inverter may be identical to the number of phases of the first power inverter.

Alternatively, the number of the output nodes of the first power inverter may be two times the number of phases of the first power inverter. This arrangement may be adventurously for driving open-ended stator windings.

The first set of stator windings may be connected in a wye or delta configuration. Alternatively, the first set of stator windings may be open-ended stator windings which require power to be supplied from both ends.

The second power inverter and the second set of stator windings may have features similar to those described above for the first power inverter and the first set of stator windings.

The plurality of power inverters may have identical circuit topologies.

One or each of the first and second power inverters may be a two-level power inverter.

One or each of the first and second power inverters may be a three-level power inverter.

One or each of the first and second power inverters may be a multi-level power inverter.

One or each of the first and second power inverters may be a full-bridge power inverter.

One or each of the first and second power inverters may be a half-bridge power inverter.

One or more of the plurality of power inverters may comprise at least one power semiconductor device electrically connected between each of the positive and negative input nodes, on the one hand, and each of the output nodes, on the other hand.

The power semiconductor devices function as switches to selectively connect the output nodes to the input nodes.

One or more of the plurality of power inverters may comprise a DC link capacitor connected between the positive and negative input nodes of the respective power inverter.

One or more of the plurality of power inverters may comprise a plurality of inverter legs connected between the positive and negative input nodes of the respective power inverter. The plurality of inverter legs may provide the output nodes of the respective power inverter, respectively.

Each of the plurality of inverter legs may comprise at least one power semiconductor device.

The electric traction system may further comprise a controller which is configured to control on and off statuses of the power semiconductor devices of the respective power inverter so as to invert the DC power received at the input nodes to AC power at the output nodes during a traction mode of the traction system.

The controller may be further configured to control on and off statuses of the power semiconductor devices of the respective power inverter so as to convert mechanical energy of the at least one electric motor to electrical energy between the positive and negative input terminals of the traction converter module during a braking mode of the traction system.

The electrical energy may be charged back to the DC power supply.

At least one of the plurality of power inverters may further comprise a bypass switch connected between the positive and negative input nodes of the respective power inverter.

The at least one of the plurality of power inverters may be configured such that when the bypass switch is in an off state (i.e., open), the respective inverter is activated and when said bypass switch is in an on state (i.e., closed), the respective inverter is deactivated.

Optionally, each of the plurality of power inverters may comprise a bypass switch connected between the positive and negative input nodes of the respective power inverter.

The plurality of power inverters may further comprise a redundant power inverter, and the redundant power inverter comprises a bypass switch connected between its positive and negative input nodes.

The redundant power inverter may be configured to replace a faulty one of the plurality of power inverters.

The traction converter module may be configured such that when the plurality of power inverters are fault free, the bypass switch of the redundant power inverter are in an on state (i.e., closed), and the bypass switches of other power converters are in an off state (i.e., open), and that when fault occurs, the bypass switch of the faulty power inverter is switched to the on state and the bypass switch of the redundant power inverter is switched to the off state.

The multi-phase electric motor may comprise a redundant set of stator windings. The output nodes of the redundant power inverter may be electrically coupled to the redundant set of stator windings.

The controller may be configured to control on and off statuses of the bypass switch.

The electric traction system may further comprise an electronic filter electrically coupled to the positive input terminal, wherein the electronic filter is configured to attenuate high-frequency current signals receivable by the positive input terminal from the DC power supply.

The electronic filter may be for electrically coupling the positive input terminal to the DC power supply. The electronic filter may comprise an inductor.

The electric traction system may further comprise a pre-charge circuit electrically coupled to the positive input terminal. The pre-charge circuit is configured to charge the DC-link capacitor prior to a normal operation of the traction converter module.

The pre-charge circuit may be for electrically coupling the positive input terminal to the DC power supply.

According to a second aspect of the present disclosure, there is provided an electric machine comprising an electric traction system according to the first aspect.

The electric machine may comprise a vehicle. The vehicle may be selected from a group consisting of an electric locomotive, an electric or hydrogen vehicle, an elevator and an electric multiple unit.

Alternatively, the electric machine may comprise an industrial apparatus.

According to a third aspect of the present disclosure, there is provided a power electronics system, comprising a DC power supply and an electric traction system according to the first aspect, wherein the positive input terminal of the electric traction system is operatively coupled to the DC power supply.

According to a fourth aspect of the present disclosure, there is provided an urban rail transit system, comprising: a DC power supply and a vehicle comprising an electric traction system according to the first aspect, wherein the positive input terminal of the electric traction system is operatively coupled to the DC power supply.

The DC power supply may comprise a DC grid.

It would be understood that the urban rail transit system may comprise one or more of a tram system, a light rail system, a rapid transit system (e.g., metro, underground, and/or subway), a monorail system, a commuter rail system, funicular, cable car, and guided bus etc.

Where appropriate any of the optional features described above in relation to one of the aspects of the present disclosure may be applied to another one of the aspects of the disclosure.

BRIEF DESCRIPTION OF THE DRAWINGS

In order that the disclosure may be more fully understood, a number of embodiments of the disclosure will now be described, by way of example, with reference to the accompanying drawings, in which.

In the figures, like parts are denoted by like reference numerals.

It will be appreciated that the drawings are for illustration purposes only and are not drawn to scale.

DETAILED DESCRIPTION OF THE PREFERRED EMBODIMENTS

Figures 1, 2:
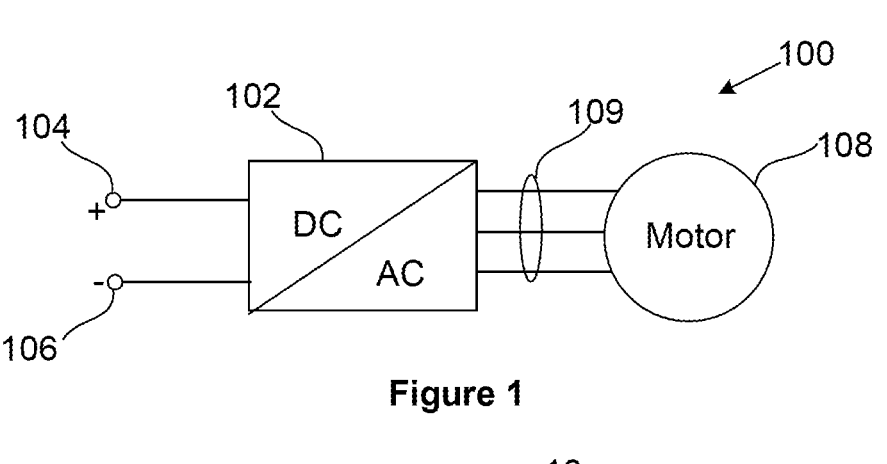
FIG. 1 is a block diagram of a prior electric traction system.
FIG. 2 is a block diagram of an electric traction system according to the present disclosure.

FIG. 2 schematically illustrates a block diagram of an electric traction system 1 (referred to as "traction system" below) according to the present disclosure. The traction system 1 uses a traction converter module 2 to replace the power inverter 102 used in the prior traction system 100. The traction converter module 2 converts DC power to AC power for driving electric motors $8_1, \ldots 8_Q$. As shown in FIG. 2, the traction converter module 2 includes a positive input terminal 4 and a negative input terminal 6, which in use are electrically coupled to a DC power supply (e.g., a DC grid).

The traction converter module 2 further includes a plurality of power inverters $11_1, \ldots 11_N$ (which are collectively referred to as 11), each of which is similar to the power inverter 102. Each power inverter $11_i$ (i=1, . . . . N) includes a positive input node $3_i$ and a negative input node $5_i$ which receives DC power, a switch $7_i$ connected between the input nodes, and output nodes $9_i$ which supply AC power for driving motor loads.

The positive and negative input nodes 3, 5 of the power inverters 11 are electrically connected in series between the positive input terminal 4 and the negative input terminal 6. In particular, the negative input node $5_i$ of a power inverter $11_i$ is electrically connected to the positive input node $3_{i+1}$ of a subsequent power inverter $11_{i+1}$, and the positive input node $3_i$ of the power inverter $11_i$ is electrically connected to the negative input node $5_{i-1}$ of a precedent power inverter $11_{i-1}$. The power inverter $11_1$ at the front of the array of power inverters 11 has its positive input node $3_1$ electrically connected to the positive input terminal 4. The power inverter $11_N$ at the rear of the array of power inverters 11 has its negative input node $5_N$ electrically connected to the negative input terminal 6.

The switches 7 function as bypass switches, and can be used to activate or deactivate corresponding power inverters 11. When a switch $7_i$ (e.g., $7_3$ in FIG. 2) is closed (i.e., at the ON status), the positive and negative input nodes $3_i$ and $5_i$ of a corresponding power inverter $11_i$ are electrically shorted together. As a result, the power inverter $11_i$ receives no DC power and thus is deactivated. Conversely, an open (i.e., OFF) switch $7_i$ (e.g., $7_1$, $7_2$ or $7_N$ in FIG. 2) allows its corresponding power inverter $11_i$ to function normally.

With reference to the circuit of FIG. 2, the active power inverters 11 which have open switches 7 (e.g., all except $11_3$ in FIG. 2) collectively share a DC voltage received between the positive and negative input terminals 4, 6. The voltage drop across the input nodes $3_i$, $5_i$ of each active inverter $11_i$ is merely a fraction of the DC voltage received between the terminals 4, 6. As compared to the prior power inverter 102, each of the power inverters 11 can be constructed by using power semiconductor devices with much lower voltage ratings (e.g., 1700V or lower). This also expands the choice of power semiconductor devices beyond Si-based IGBTs and SiC-based devices. For example, Si-based metal-oxide-semiconductor field effect transistors (MOSFETs) and Gallium nitride (GaN) based MOSFETs may be used to construct the power inverters 11.

Power semiconductor devices with lower voltage ratings typically have smaller package dimensions, lower prices, and higher maturity than power semiconductor devices with higher voltage ratings. Further, low-voltage power semiconductor devices provide lower switching loss and higher efficiency than high-voltage power semiconductor devices. In addition, low-voltage power semiconductor devices relax cooling and heat exchange requirements, enabling the traction system 1 to have reduced weight, volume and costs.

Because the traction system 1 allows the use of lower rating power semiconductor devices by improving the circuit structure, rather than requiring a lower rating DC power supply, the traction system 1 may use the same DC power supply as the prior traction system 100. Accordingly, the traction system 1 may directly replace existing traction system 100 in urban rail transit applications.

The traction system 1 further includes a controller 10. The controller 10 controls the on/off switching of the bypass switches 7 using signal lines 12. The controller 10 also controls the on/off switching of power semiconductor devices within each power inverter 11 using signal lines 14. As a result, the functioning of each power inverter 11 can be independently controlled by the controller 10. The switches 7 may be implemented as gate controlled power switches, e.g., MOSFETs or IGBTs, or current controller power switches, e.g., thyristors. The controller 10 may comprise a controlling unit (such as, a processor, a programmable logic device, and/or an application-specific integrated circuit (ASIC) etc.) as well as driver circuitry for transforming low-current control signals output by the controlling unit to higher-current control signals. While FIG. 2 shows that the controller 10 is part of the traction system 1, it would be appreciated that the controller 10 may alternatively be an external component of the traction system 1.

The traction system 1 also includes electric motors $8_1, \ldots 8_Q$, which are AC motors. The stator windings of the electric motors $8_1, \ldots 8_Q$ are electrically coupled to the output nodes 9 of one or more of the power inverters 11. As a result, the traction converter module 2 drives the electric motors $8_1, \ldots 8_Q$ by supplying AC power to the motors. The electric motors $8_1, \ldots 8_Q$ typically generates a traction force causing the propulsion of an electric machine (e.g., a vehicle or an industrial machine etc.), and thus may be referred to as tractor motors. One or more of the electric motors $8_1, \ldots 8_Q$ may be an asynchronous motor or a permanent magnet synchronous motor.

In the example of FIG. 2, the electric motor $8_1$ is a multi-phase electric motor. A multi-phase motor generally has more than three phases (e.g., five to nine phases). For a conventional three-phase motor (such as the motor 108), if one of the phases is lost, the rotatory field within the motor also disappears and the motor would stop working. As compared to conventional three-phase motors, the multi-phase motor $8_1$ has a greater fault tolerance because it provides phase redundancy and can operate during phase open fault. Therefore, the use of the multi-phase motor $8_1$ enables the traction system 1 to have a higher reliability. Further, the multi-phase motor $8_1$ achieves higher torque density, reduced amplitude and increased frequency of torque pulsation, higher efficiency, lower DC link current harmonics as well as better noise and vibration characteristic, as compared to a conventional three-phase motor. Further, the multi-phase electric motor $8_1$ can be controlled with a greater degree of freedom than a conventional three-phase electrical motor, thereby enabling the motor $8_1$ to achieve greater regulations of torque and the shaft voltage. The electric motor $8_1$ may be an asynchronous motor or a permanent magnet synchronous motor.

The circuit topology of the traction converter module 2 is particular suitable for driving a multi-phase electric motor such as the motor $8_1$. With reference to FIG. 2, at least two of the power inverters 11 drive the motor $8_1$. For example, the output nodes $9_1$ of the power inverter $11_1$ drive a set (e.g., three phases) of the stator windings of the motor $8_1$, and the output nodes $9_2$ of the power inverter $11_2$ drive another set of the stator windings of the motor $8_1$. The motor $8_1$ may have further stator windings driven by other inverter(s) 11. Preferably, the number of phases (e.g., equal to or more than three) of a power inverter may be identical to the number of phases of the set of stator windings driven thereby. Therefore, each power inverter supplies a fraction of the total power required by the motor $8_1$. By making the power inverters (e.g., $11_1$, $11_2$, etc.) driving the motor $8_1$ to have identical circuit topologies, each of the power inverters supplies an equal amount of power (e.g., 50% of the total power required by the motor $8_1$) to a respective set of stator windings of the motor $8_1$ and thus achieves power matching with respect to one another.

The sets of stator windings within the motor $8_1$ may be electrically isolated from one another, by for example having separated neutral points. The electrical isolation between the sets of stator windings is useful for improving system reliability. Alternatively, the sets of stator windings within the motor $8_1$ may share the same neutral points. In any event, the motor $8_1$ has more than three phases. The multiple sets of stator windings can be independently controlled, and thus allow a higher degree of control freedom for optimising torque and shaft voltage of the motor $8_1$.

The traction system 1 is also configured with redundancy. With reference to FIG. 2, the multi-phase electric motor $8_1$ includes a redundant set of stator windings which are electrically coupled to the output nodes $9_3$ of a redundant power inverter $11_3$. During normal operation, the bypass switch $7_3$ of the power inverter $11_3$ is kept closed by the controller 10 so as to deactivate the redundant power inverter $11_3$. Meanwhile, the switches $7_1$, $7_2$ of the power inverters $11_1$, $11_2$ are kept open by the controller 10. As such, the power inverters $11_1$, $11_2$ drive the motor $8_1$ collectively. In the event that faults occur in the power inverter $11_1$ or $11_2$ or the stator windings driven thereby, the controller 10 closes the switch $7_1$ or $7_2$ of the faulty branch, and opens the switch $7_3$ of the redundant power inverter $11_3$ so as to activate the redundant power inverter $11_3$. Thus the redundant power inverter $11_3$ drives the motor $8_1$ with other active inverter(s). This redundancy mechanism provided by the multi-phase electric motor $8_1$ and the traction converter module 2 allows the traction system 1 to continue functioning in the event of faults occurring in the motor $8_1$ or the power inverters 11, thereby significantly improving the reliability of the traction system 1.

FIG. 2 shows that the traction system 1 includes a further motor $8_Q$, which is driven by at least the output nodes $9_N$ of the power inverter $11_N$. The further motor $8_Q$ may be a conventional three phase motor or a multi-phase electric motor similar to the motor $8_1$. It will however be appreciated that the further motor $8_Q$ may be omitted such that the traction system 1 includes a single multi-phase electric motor $8_1$ or multiple multi-phase electric motors $8_1$ to $8_{Q-1}$. The multiple multi-phase electric motors $8_1$-$8_{Q-1}$ may have identical motor topologies, and/or may be driven by groups of inverters having identical circuit topologies. While FIG. 2 shows that the multi-phase motor $8_1$ is driven by at least two power inverters (e.g., $11_1$, $11_2$), it would be understood that the multi-phase motor $8_1$ may be driven by a single power inverter which outputs multiple phases of AC power.

Although it is not shown in FIG. 2, electrical contacts may be connected between one or more output nodes 9 of at least one power inverter 11 and respective stator winding(s) of motor(s) 8. An electrical contact is an electrical circuit component commonly found in electrical switches, relays, connectors and circuit breakers. Each contact is a piece of electrically conductive material, typically metal. When a pair of electrical contacts touch, they can pass an electrical current and allow the corresponding output node 9 and the stator winding to be electrically connected.

It will also be understood that the bypass switches 7 may be omitted such that all of the power inverters 11 are active power inverters.

While the power inverters 11 convert DC power received at the input nodes 3, 5 to AC power at the output nodes 9, the power inverters 11 may also perform an opposite function of AC-to-DC rectification, i.e., converting AC power received at the output nodes 9 to DC power at the input nodes 3, 5. The opposite function of rectification enables regenerative braking of the traction system 1, and converts mechanical energy of the motor 8 back to electric energy. The electric energy can be stored at DC-link capacitors (described below in more detail) which are connected between the input nodes 3, 5 of the power inverters 11, and may be further returned to the DC power supply. The controller 10 controls the working modes of the power inverters 11 as well as the directions of power flow through the power inverters 11.

While FIG. 2 shows that the traction converter module 2 includes more than four power inverters 11 which are electrically connected in series at their input sides, it would be understood that this is just for illustration and in no way imply any limitation to the number of power inverters 11. Indeed, having at least two power inverters 11 connected in series at the input sides would allow the traction converter module 2 to achieve the advantages described above.

Each of the power inverters 11 may be implemented using various circuit topologies, e.g., a two-level, three-level or multi-level inverter, a full-bridge or half-bridge inverter etc. It would be understood that at least one power semiconductor device is electrically connected between each of the output nodes 9 and each of the input nodes 3, 5. The at least one power semiconductor device may be electrically connected in series or in parallel between the nodes.

It is preferable that the power inverters 11 within the traction converter module 2 are identical to one another (i.e., identical circuit topology with identical device parameters), so that the active power inverters 11 would equally share the DC voltage between the positive and input terminals 4, 6. However, it would be appreciated that this arrangement is not necessary.

Further, the power inverters 11 may be three-phase inverters which are ideal for driving sets of three-phase windings of the motor(s) 8. However, it would be appreciated that the phases of each power inverter 11 may be more than three.

FIGS. 3 to 6 provide exemplary circuit diagrams of the traction system 1 and the power inverter 11.

Figure 3:
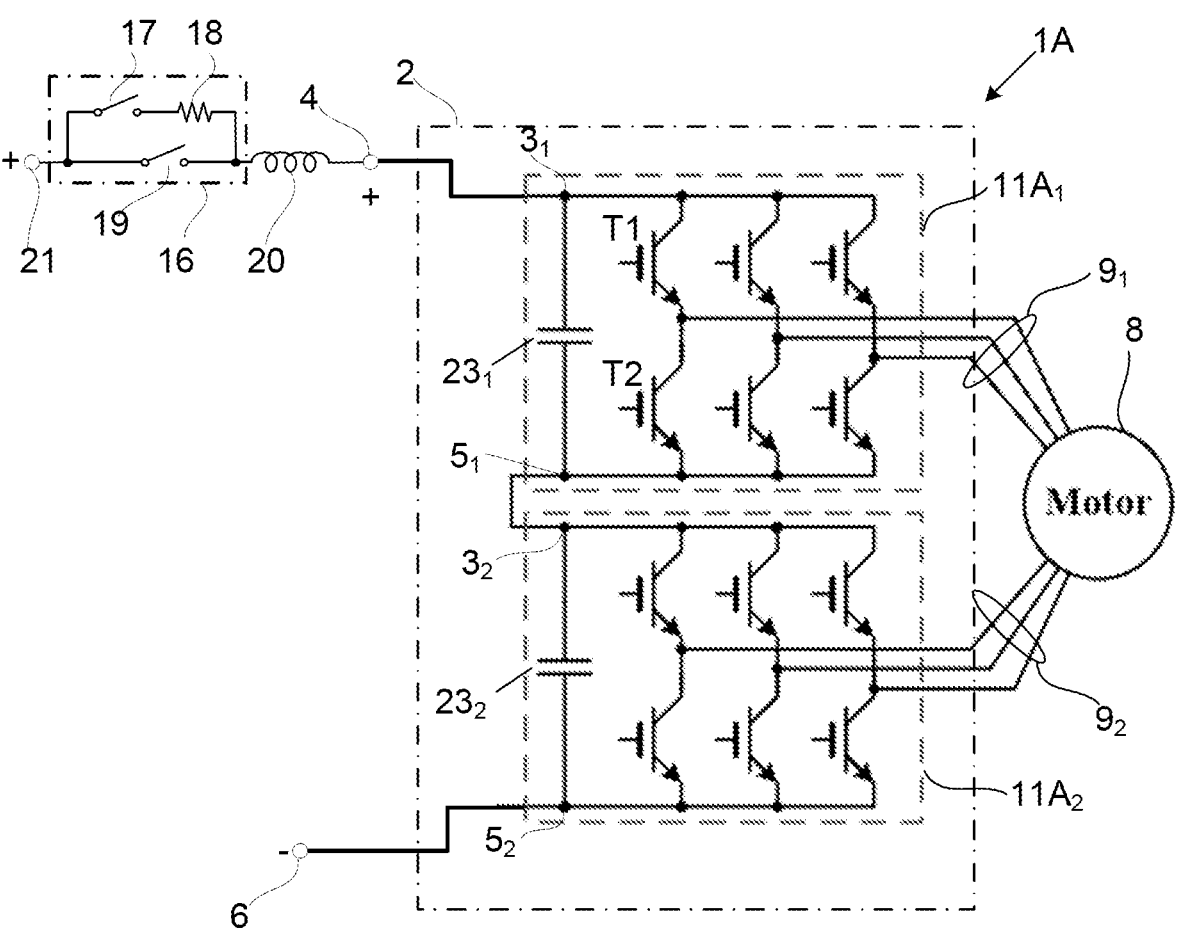
FIG. 3 is a schematic circuit diagram of an electric traction system constructed based upon FIG. 2.

FIG. 3 shows the circuit diagram of an electric traction system 1A which has been constructed based upon the block diagram of FIG. 2. In the example of FIG. 3, the traction converter module 2 includes two power inverters $11A_1$ and $11A_2$ (collectively referred to as 11A), which drive a multi-phase motor 8 together. The input sides of the power inverters 11A are electrically connected in series between the positive and negative input terminals 4, 6 of the traction converter module 2. In particular, the negative input node $5_1$ of the first power inverter $11A_1$ is electrically connected to the positive input node 32 of the second power inverter $11A_2$, and the positive input node $3_1$ of the first power inverter $11A_1$ is electrically connected to the positive input terminal 4. Meanwhile, the negative input node $5_2$ of the second power inverter $11A_2$ is electrically connected to the negative input terminal 6. For simplicity, the electric traction system 1A does not include any bypass switch 7 or redundant power inverter. While it is not shown in FIG. 3, it would be understood that the operations of power semiconductor devices within the power inverters 11A are controlled by a controller (similar to the controller 10 of FIG. 2).

The two power inverters $11A_1$ and $11A_2$ have identical circuit topology and identical device parameters. Thus, the power inverters $11A_1$ and $11A_2$ equally share the DC voltage received by the positive and negative input terminals 4, 6. As shown in FIG. 3, each of the power inverters 11A is a two-level three-phase full-bridge inverter. For simplicity, the description below describes the structure of the power inverter 11A$_1$ only. It would be understood that the description similarly applies to the power inverter 11A$_2$. The power inverter 11A$_1$ comprises a DC-link capacitor 23$_1$ electrically connected between the positive and negative input nodes 3$_1$, 5$_1$, and three inverter legs each providing an output node. The three inverter legs have identical structures. The first inverter leg comprises two power semiconductor devices T1 and T2 connected between the positive and negative input nodes 3$_1$, 5$_1$, with its output node being between the two devices T1, T2. By controlling the power semiconductor devices of the three inverter legs to switch on and off at different times, the AC power provided at the three output nodes 9$_1$ of the power inverter 11A$_1$ has three phases.

In an example, the multi-phase motor 8 is a dual three-phase motor (i.e., 6 phases in total), which includes two sets of three-phase stator windings. The two sets of three-phase stator windings are electrically isolated from one another, by for example having separated neutral points. The multi-phase motor 8 replaces the three-phase motor 108 of the prior traction system 100, but maintains the same rated power. In an example, the multi-phase motor 8 has a rated power of 200 kW, and each set of three-phase stator windings is thus rated at 100 KW. The output nodes 9$_1$ of the power inverter 11A$_1$ are electrically coupled to the first set of three-phase stator windings. The output nodes 9$_2$ of the power inverter 11A$_2$ are electrically coupled to the second set of three-phase stator windings. The power inverters 11A$_1$ and 11A$_2$ therefore independently control power flow into/from the respective set of three-phase stator windings. Each of the power inverters 11A$_1$ and 11A$_2$ supplies a half of the total power required by the motor 8.

With reference to FIG. 3, the electric traction system 1A has a positive terminal 21. In use, a DC power supply (e.g., a DC grid) is connected between the positive terminal 21 and the negative input terminal 6 of the traction converter module 2. A pre-charge circuit 19 and an electronic filter 20 (described below in more detail) are electrically connected in series between the positive terminal 21 and the positive input terminal 4. In use, the voltage drop across the pre-charge circuit 19 and the electronic filter 20 would be negligible. Therefore, the DC voltage across the positive input terminal 4 and the negative input terminal 6 is substantially identical to the DC voltage provided by the DC power supply.

The DC grid may be approximately 1500V or adjusted according to actual requirements. In the event that the DC grid is rated at 1500V, the input of each power inverter would be rated and stabilized at 750V DC through control. The power semiconductor devices used within the power inverters 11A may be 1700V rated devices rather than 3300V Si-based semiconductor power devices used in the prior traction system 100. Examples of 1700V rated power devices include Si-based IGBTs, Si-based MOSFETs, SiC-based MOSFETs, GaN-based MOSFETs, or other semiconductor-based power devices.

The pre-charge circuit 19 includes a first switch 17 in series connection with a pre-charge resistor 18, and a second switch 19 in parallel connection with the switch 17 and the resistor 18. Prior to normal operation of the traction converter module 2, the first switch 17 is closed while the second switch 19 is open. In this way, DC-link capacitors 23 of the power inverters 11A are charged by the DC power supply through the pre-charge resistor 18. Once pre-charge of the DC-link capacitors 23 is completed, the pre-charge resistor 18 is bypassed by closing the second switch 19 and opening the first switch 17. Pre-charging the DC-link capacitors 23 is useful for preventing excessive inrush current at system start-up which may damage the DC-link capacitors 23 and the power semiconductor devices of the power inverters 11A.

The electronic filter 20 comprises an inductor, and is useful for reducing high-frequency current contents from/to the DC grid. The high-frequency current contents may cause resonance within the traction system 1A, and thus it is beneficial to filter out the high-frequency current contents. The pre-charge circuit 19 and the electronic filter 20 may also be applied within the traction system 1 of FIG. 2.

The traction system 1A may operate at a traction mode and a braking mode. During the traction mode, the traction system 1A draws power from the DC grid and the voltage of the DC grid is equally shared by the two power inverters 11A in case of balanced loading. Two sets of three-phase AC voltages, with variable frequency and variable fundamental magnitude, are produced by the two power inverters 11A to drive the six-phase traction motor 8. In this process electrical power is converted to mechanical power. During the braking mode, mechanical power of the six-phase motor 8 is regenerated to electrical power in a controlled way. Through the two power inverters 11A, the electrical power is rectified back to the two DC-link capacitors 23 in series then back to the DC grid via an L-C filter. The L-C filter is constructed by the DC-link capacitors 23 and the inductor 20.

The traction system 1A of FIG. 3 is flexible for extension. For example, it may be extended such that more than two power inverters 11A are connected in series between the positive and negative input terminals 4, 6, and that the multiple-phase motor 8 comprises more than two sets of three-phase windings. In an example, the traction converter module 2 comprises three power inverters 11A with their input nodes electrically connected in series between the terminals 4, 6, and the three power inverters 11A collectively drive a 9-phase (e.g., triple 3-phase) traction motor. Thus, each of the three power inverters 11A is responsible for a third of the motor power. In the event that the DC grid is rated at 1500V, the input of each power inverter would be rated and stabilized at 500V DC through control. Thus, 1200V-rated power semiconductor devices are suitable for use within the power inverters 11A. Examples of 1200V rated power devices include Si-based IGBTs, Si-based MOSFETs, SiC-based MOSFETs, GaN-based MOSFET, or other semiconductor-based power devices.

Figure 4:
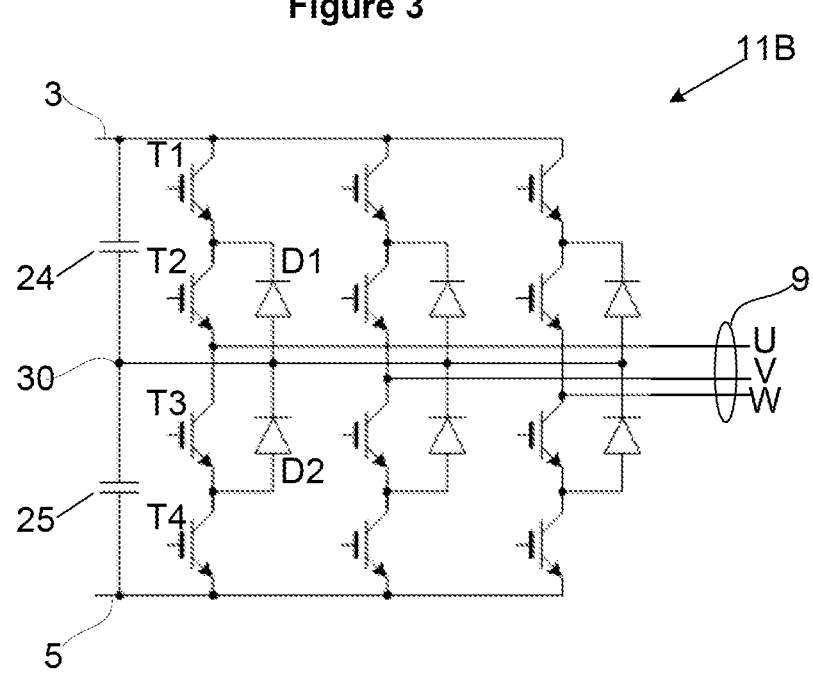
FIG. 4 is a schematic circuit diagram of a power inverter which may be used in the electric traction system of FIG. 2 or FIG. 3.

The power inverters 11A of FIG. 3 are two-level three-phase full-bridge inverters. It would be appreciated that they may be replaced by other types of power inverters. FIG. 4 illustrates a three-level three-phase neutral-point-clamped (NPC) full-bridge inverter 11B. The number of levels of a power inverter indicate the number of output levels. A three-level power inverter means that the inverter can output three different voltage levels (e.g., 0, $V_{dd}/2$, $V_{dd}$) at its output nodes, with $V_{dd}$ being the voltage difference between the positive and negative input nodes.

As shown in FIG. 4, the power inverter 11B comprises a positive input node 3, a negative input node 5, and two DC-link capacitors 24, 25 electrically connected in series between the positive and negative input nodes 3, 5. A node 30 is between the two capacitors 24, 25. Because the capacitors 24, 25 have identical capacitance, the potential of the node 30 is centred between the potentials of the input nodes 3, 5. The power inverter 11B further includes the three inverter legs which have identical structures and device parameters. For simplicity, the description below describes the structure of the first inverter leg only. It would be understood that the description similarly applies to the other two inverter legs. The first inverter leg comprises two power semiconductor devices T1 and T2 connected in series between the positive input node 3 and an output node U, two further power semiconductor devices T3 and T4 connected in series between the negative input node 5 and the output node U, a diode D1 connected between the node 30 and a middle node between the devices T1 and T2, and a diode D2 connected between the node 30 and a middle node between the devices T3 and T4. When the devices T1 and T2 are switched on, the output node U has a voltage level equal to that of the positive input node 3. When the devices T3 and T4 are switched on, the output node U has a voltage level equal to that of the negative input node 5. When the devices T2 and T3 are switched on, the output node U has a voltage level equal to that of the node 30. By controlling the power semiconductor devices of the three inverter legs to switch on and off at different times, the AC power provided at the three output nodes 9 of the power inverter 11B has three phases.

The power inverter 11B of FIG. 4 may be used to replace each of the power inverters $11A_1$ and $11A_2$ of FIG. 3. In the event that the DC grid is 1500V, the input of each power inverter 11B would be rated and stabilized at 750V DC through control. Because there are always two power semiconductor devices (e.g., T1&T2, or T3&T4) connected in series between each of the input nodes 3, 5 and an output node U, V or W, the power semiconductor devices used within the power inverters 11B may be 900V rated devices rather than 1700V rated devices used in the power inverter 11A or 3300V rated devices used in the prior traction system 100. Examples of 900V rated power devices include Si-based IGBTs, Si-based MOSFETs, SiC-based MOSFETs, GaN-based MOSFETs, or other semiconductor-based power devices.

In the examples provided by FIGS. 3 and 4, in order to drive a set of three-phase stator windings of a traction motor 8, the respective power inverter has three output nodes each supplying one phase of AC power to a corresponding phase of the traction motor 8. This arrangement may be suitable when the motor windings are connected in star (i.e., wye) or delta configuration. In the event that the traction motor has open-end stator windings, a power inverter 11C or 11D as shown in FIGS. 5 and 6 may be used to replace each of the power inverters $11A_1$ and $11A_2$ of FIG. 3.

Figure 5:
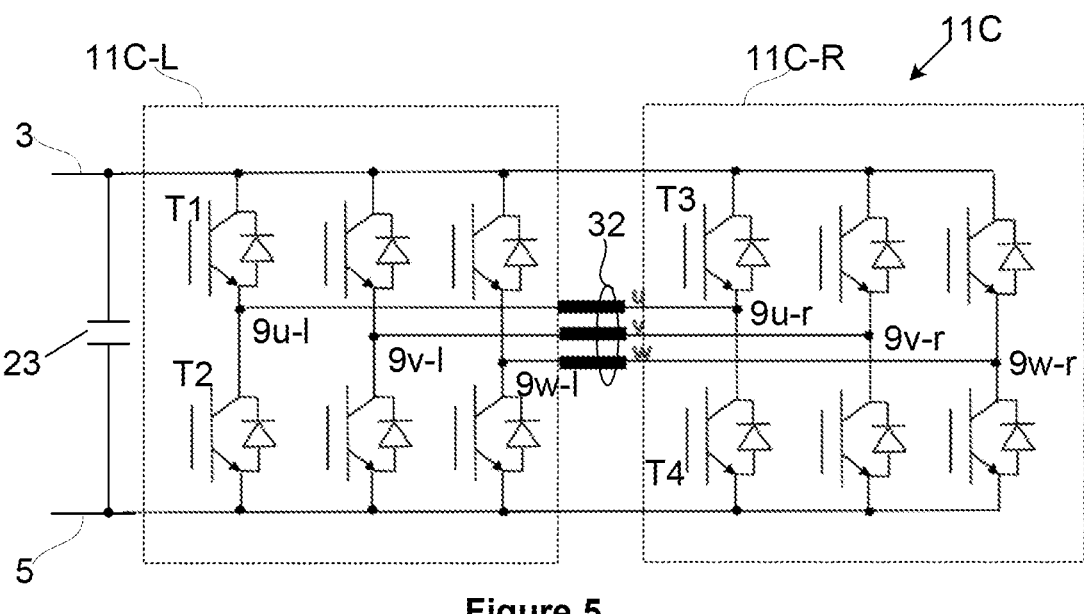
FIG. 5 is a schematic circuit diagram of another power inverter which may be used in the electric traction system of FIG. 2 or FIG. 3.
Figure 6:
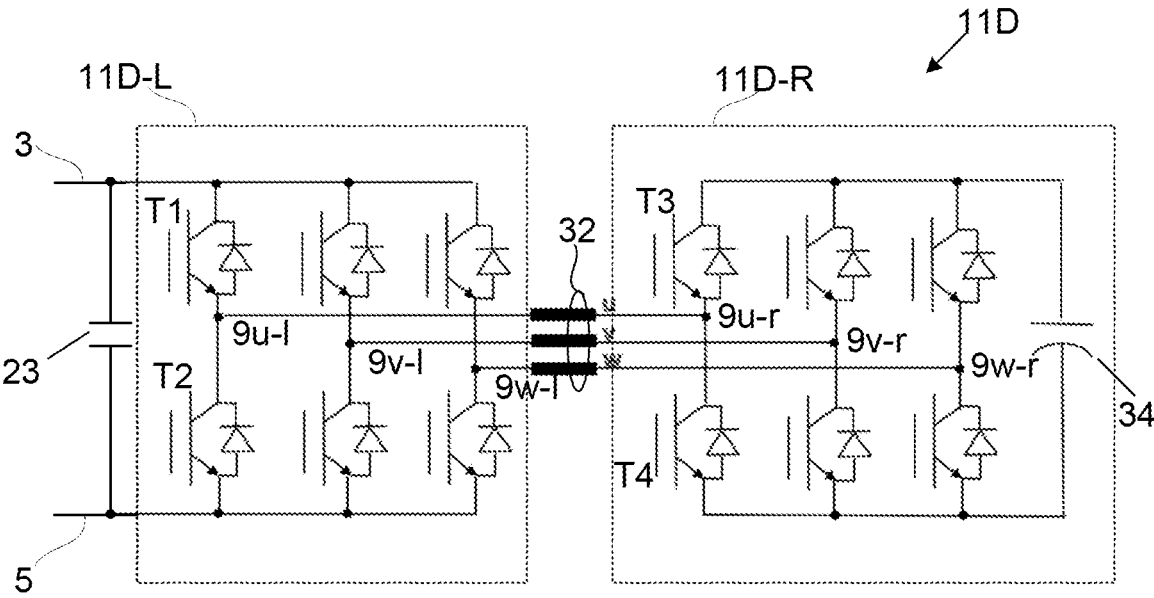
FIG. 6 is a schematic circuit diagram of a further power inverter which may be used in the electric traction system of FIG. 2 or FIG. 3.

As shown in FIG. 5, the power inverter 11C comprises a positive input node 3, a negative input node 5, and a DC-link capacitor 23 electrically connected between the positive and negative input nodes 3, 5. The power inverter 11C further includes the three pairs of inverter legs which have identical structures. For simplicity, the description below describes the structure of the first pair of inverter legs only. The first pair of inverter legs comprises two power semiconductor devices T1 and T2 connected in series between the input nodes 3, 5, an output node 9u-l between the devices T1 and T2, two further power semiconductor devices T3 and T4 connected in series between the input nodes 3, 5, and an output node 9u-r between the devices T3 and T4. A stator winding is connected between the pair of output nodes 9u-l, 9u-r, which supply AC power to the stator winding at both ends. FIG. 5 shows a set of three-phase stator windings 32. To drive the three-phase stator windings 32, three pairs of inverter legs are employed, generating three pairs of output nodes.

The power inverter 11C may also be considered as being a combination of two power inverters 11C-L, 11C-R connected at opposite sides of the stator windings 32. The two power inverter 11C-L, 11C-R share the same DC-link capacitor 23, the same input nodes 3, 5 and the same DC power supply (not shown). Each of the inverters is a two-level three-phase full-bridge power inverter that is similar to the power inverter 11A of FIG. 3.

Similar to the power inverter 11C, the power inverter 11D may also be considered as being a combination of two power inverters 11D-L, 11D-R arranged at opposite sides of the stator windings 32. However, the DC power supply of the inverter 11D-R is replaced by a capacitor 34.

The traction systems 1, 1A of the present disclosure may be part of an electric machine. Typical examples of the electric machine include a vehicle (such as, an electric locomotive, an electric or hydrogen vehicle, an elevator or an electric multiple unit) and an industrial apparatus.

While the traction systems 1, 1A of the present disclosure are particularly suitable for use in urban rail transit applications, they can also be used in any power electronics traction system which uses a DC power supply to drive AC electric motor loads.

Urban rail transit is an all-encompassing term for various types of local rail systems providing passenger service within and around urban or suburban areas. An urban rail transit system typically comprises one or more of a tram system, a light rail system, a rapid transit system (e.g., metro, underground, and/or subway), a monorail system, a commuter rail system, funicular, cable car, guided bus etc.

The terms "having", "containing", "including", "comprising" and the like are open and the terms indicate the presence of stated structures, elements or features but not preclude the presence of additional elements or features. The articles "a", "an" and "the" are intended to include the plural as well as the singular, unless the context clearly indicates otherwise.

Although the disclosure has been described in terms of preferred embodiments as set forth above, it should be understood that these embodiments are illustrative only and that the claims are not limited to those embodiments. Those skilled in the art will be able to make modifications and alternatives in view of the disclosure which are contemplated as falling within the scope of the appended claims. Each feature disclosed or illustrated in the present specification may be incorporated in the disclosure, whether alone or in any appropriate combination with any other feature disclosed or illustrated herein.

The invention claimed is:

1. An electric traction system, comprising:
   a traction converter module comprising a positive input terminal and a negative input terminal for operatively coupling to a DC power supply, and a plurality of power inverters, each of which comprises positive and negative input nodes configured to receive DC power, and output nodes configured to supply AC power, wherein the positive and negative input nodes of the plurality of power inverters are electrically connected in series between the positive input terminal and the negative input terminal;
   at least one electric motor configured to be driven by the traction converter module, the at least one electric motor comprising a multi-phase electric motor; and
   a controller;
   wherein the plurality of power inverters comprise a first power inverter and a second power inverter, and the output nodes of the first and second power inverters are configured to supply AC power to the multi-phase electric motor so as to drive the multi-phase electric motor;

wherein the plurality of power inverters further comprise a redundant power inverter, and the redundant power inverter comprises a bypass switch connected between its positive and negative input nodes;

wherein the multi-phase electric motor comprises a redundant set of stator windings, and the output nodes of the redundant power inverter are electrically coupled to the redundant set of stator windings; and wherein the controller is configured to control on and off statuses of the bypass switch such that: when the bypass switch is on, the redundant power inverter is deactivated from supplying AC power to the redundant set of stator windings and when the bypass switch is off, the redundant power inverter is activated to supply AC power to the redundant set of stator windings.

2. An electric traction system according to claim 1, wherein the first and second power inverters have identical circuit topologies.

3. An electric traction system according to claim 2, wherein a number of phases of the first power inverter is identical to a number of phases of the first set of stator windings.

4. An electric traction system according to claim 1, wherein the multi-phase electric motor comprises a first set of stator windings and a second set of stator windings, and wherein the output nodes of the first power inverter are electrically coupled to the first set of stator windings, and the output nodes of the second power inverter are electrically coupled to the second set of stator windings.

5. An electric traction system according to claim 4, wherein the first set of stator windings and the second set of stator windings are electrically isolated from one another.

6. An electric traction system according to claim 1, wherein one or more of the plurality of power inverters comprises at least one power semiconductor device electrically connected between each of the positive and negative input nodes, on the one hand, and each of the output nodes, on the other hand.

7. An electric traction system according to claim 6, further comprising a controller which is configured to control on and off statuses of the power semiconductor devices of the respective power inverter so as to invert the DC power received at the input nodes to AC power at the output nodes during a traction mode of the traction system.

8. An electric traction system according to claim 7, wherein the controller is further configured to control on and off statuses of the power semiconductor devices of the respective power inverter so as to convert mechanical energy of the at least one electric motor to electrical energy between the positive and negative input terminals of the traction converter module during a braking mode of the traction system.

9. An electric traction system according to claim 1, wherein one or more of the plurality of power inverters comprises a DC link capacitor connected between the positive and negative input nodes of the respective power inverter.

10. An electric traction system according to claim 9, further comprising a pre-charge circuit electrically coupled to the positive input terminal, wherein the pre-charge circuit is configured to charge the DC-link capacitor prior to a normal operation of the traction converter module.

11. An electric traction system according to claim 1, wherein one or more of the plurality of power inverters comprises a plurality of inverter legs connected between the positive and negative input nodes of the respective power inverter, and wherein the plurality of inverter legs provide the output nodes of the respective power inverter, respectively.

12. An electric traction system according to claim 11, wherein each of the plurality of inverter legs comprises at least one power semiconductor device.

13. An electric traction system according to claim 1, wherein at least one of the plurality of power inverters further comprises a bypass switch connected between the positive and negative input nodes of the respective power inverter.

14. An electric traction system according to claim 1, further comprising an electronic filter electrically coupled to the positive input terminal, wherein the electronic filter is configured to attenuate high-frequency current signals receivable by the positive input terminal from the DC power supply.

15. An electric machine comprising an electric traction system according to claim 1.

16. An electric machine according to claim 15, wherein the electric machine comprises a vehicle.

17. A power electronics system, comprising a DC power supply and an electric traction system according to claim 1, wherein the positive input terminal of the electric traction system is operatively coupled to the DC power supply.

18. An urban rail transit system, comprising: a DC power supply and a vehicle comprising an electric traction system according to claim 1, wherein the positive input terminal of the electric traction system is operatively coupled to the DC power supply.

* * * * *